US012600834B2

(12) United States Patent
Bai et al.

(10) Patent No.: US 12,600,834 B2
(45) Date of Patent: Apr. 14, 2026

(54) METHOD FOR PREPARING FOAMING MATERIALS BY NITROGEN FOAMING

(71) Applicant: Jiangsu Damaoniu New Material Technology Co., Ltd., Nanjing (CN)

(72) Inventors: Peng Bai, Nanjing (CN); Zhenxiu Zhang, Nanjing (CN)

(73) Assignee: Jiangsu Damaoniu New Material Technology Co., Ltd., Nanjing (CN)

( * ) Notice: Subject to any disclaimer, the term of this patent is extended or adjusted under 35 U.S.C. 154(b) by 5 days.

(21) Appl. No.: 17/773,853

(22) PCT Filed: Mar. 8, 2022

(86) PCT No.: PCT/CN2022/079783
§ 371 (c)(1),
(2) Date: May 3, 2022

(87) PCT Pub. No.: WO2023/019920
PCT Pub. Date: Feb. 23, 2023

(65) Prior Publication Data
US 2024/0174829 A1 May 30, 2024

(30) Foreign Application Priority Data
Aug. 16, 2021 (CN) .......................... 202110935419.6

(51) Int. Cl.
*C08J 9/12* (2006.01)
*B29C 44/02* (2006.01)
(Continued)

(52) U.S. Cl.
CPC .............. *C08J 9/122* (2013.01); *B29C 44/022* (2013.01); *B29C 44/3453* (2013.01);
(Continued)

(58) Field of Classification Search
CPC .......... C08J 9/122; C08J 2323/12; C08J 9/18; B29C 44/022; B29C 44/348; B29C 44/3488; B29C 44/3453; B29C 44/027
(Continued)

(56) References Cited

U.S. PATENT DOCUMENTS 4,617,323 A * 10/1986 Kuwabara .................. C08J 9/18
521/143
4,704,239 A * 11/1987 Yoshimura ............... C08J 9/122
264/DIG. 13

OTHER PUBLICATIONS

Machine Translation of CN 108102338. (Year: 2018).*
Machine translation of CN 111251524 by Liao et al. (Year: 2020).*

* cited by examiner

*Primary Examiner* — Christina H.W. Rosebach
(74) *Attorney, Agent, or Firm* — Jose Cherson Weissbrot

(57) ABSTRACT

The invention relates to the field of physical foaming. The method includes the following steps: crosslink the foaming matrix to obtain a plurality of crosslinked prefabricated products, add the crosslinked prefabricated products into a reaction reactor filled with polar liquid, add nitrogen for foaming, relieve pressure, and heat for foaming to obtain the foaming materials. In the polar liquid system, the inventor finds that the ratio of the distance between the adjacent crosslinked prefabricated products to the thickness of the prefabricated products as well as the difference between the melting temperature of the polymer and the temperature of the polar liquid need to be controlled to promote the adjacent prefabricated products in full contact with the polar liquid, and prefoaming can be carried out under the condition of low temperature difference, namely, at the low temperature of the polar liquid.

9 Claims, 3 Drawing Sheets

(51) Int. Cl.
    *B29C 44/34*         (2006.01)
    *C08J 3/24*          (2006.01)

(52) U.S. Cl.
    CPC ........ *B29C 44/348* (2013.01); *B29C 44/3488*
               (2013.01); *C08J 3/24* (2013.01); *C08J*
        *2203/06* (2013.01); *C08J 2323/12* (2013.01);
                       *C08J 2331/04* (2013.01)

(58) Field of Classification Search
    USPC ........................................................ 521/60
    See application file for complete search history.

METHOD FOR PREPARING FOAMING MATERIALS BY NITROGEN FOAMING

TECHNICAL FIELD

The invention relates to the field of physical foaming, in particular to C08J9/12.

BACKGROUND

Cellular material is a polymer material with a large number of cells distributed inside. At present, the foaming methods mainly include chemical foaming and physical foaming, compared with chemical foaming, physical foaming has no chemical changes, but only changes the physical state, which is conducive to environmental protection.

CN110343330A discloses a crosslinked polypropylene foaming material and a preparation method thereof, wherein the foaming material includes the following raw materials: a matrix resin, a foaming agent, an antioxidant, a foaming stabilizer and a sensitizer; the preparation method thereof includes extrusion molding, radiation crosslinking, foaming agent impregnation and other steps, and pollution-free carbon dioxide is used as the foaming agent in the preparation process of the invention; compared with the traditional crosslinked polypropylene foaming material, the crosslinked polypropylene foaming material of the invention does not cause secondary pollution and meets the requirements for environmental protection.

However, the foaming ratio is unstable and the cells are uneven in the current foaming material preparation process, so it is necessary to provide a new preparation method to improve the stability of the foaming ratio and the cell uniformity.

SUMMARY

In order to solve the above problems, the invention provides a method for preparing foaming materials by nitrogen foaming, which includes the following steps: crosslink the foaming matrix to obtain a plurality of crosslinked prefabricated products, add the crosslinked prefabricated products into a reaction reactor filled with polar liquid, add nitrogen for foaming, relieve pressure, and heat for foaming to obtain the foaming materials. The invention does not limit the amount of polar liquid, and the foaming matrix is completely immersed in the polar liquid.

In one embodiment, the raw materials for preparing the foaming matrix of the invention include polymers, namely, rubber and/or plastic, which are not limited, such as polyethylene, polypropylene, polytetrafluoroethylene. EPDM rubber, polyvinyl alcohol, polyamide, etc.

In one embodiment, the raw materials for preparing the foaming matrix also include a crosslinker, which accounts for 1-5 wt % of the polymer.

Different crosslinkers can be selected according to different functional groups of the polymer, such as peroxide crosslinker, isocyanate crosslinker and multi-vinyl crosslinker, which are not limited.

Examples of peroxide crosslinkers include but are not limited to 1,1-Di-(tert-butylperoxy)-3,3,5-trimethylcyclohexane, t-butyl peroxy 2-ethylhexyl monocarbonate, 1,1-bis (tert-amyl peroxy)cyclohexane, 2,5-dimethyl-2,5-bis(tertabutyl-peroxy)hexane, tert-butylperoxy 2-ethylhexyl carbonate, and tert-butyl peroxy-3,5,5-trimethylhexanoate.

Examples of isocyanate crosslinkers include but are not limited to toluene diisocyanate, diphenylmethane diisocyanate, isophorone diisocyanate, hexamethylene diisocyanate, and dicyclohexylmethane diisocyanate.

Examples of multi-vinyl crosslinkers include but are not limited to trimethylolpropane trimethacrylate, triallyl isocyanurate, 1,4-butanediol dimethylacrylate, and triethylene glycol dimethacrylate In one embodiment, the raw materials for preparing the foaming matrix of the invention also include initiators, which account for 1-5 wt % of the polymer; the initiators can be photoinitiators or thermal initiators, which are not limited, for example, benzyl phenyl ketone, 2,2-dimethoxy-1, 2-diphenylethanone, benzophenone, 2,4-dihydroxy benzophenone, Michler's ketone, benzoyl peroxide, lauroyl peroxide, tert-butyl peroxybenzoate, tert-butyl peroxypivalate, azodiisobutyronitrile, and 2,2'-azobis(2,4-dimethyl) valeronitrile.

In one embodiment, the raw materials for preparing the foaming matrix of the invention also include fillers, antioxidants, nucleating agents, compatibilizers and other auxiliaries, which are not limited.

In one embodiment, the crosslinking method for the foaming matrix in the invention is selected from one of thermal curing, ultraviolet curing and radiation curing, which are not limited. After the foaming matrix is crosslinked and formed, the crosslinked prefabricated product with certain shape and size is obtained, which is used for foaming to get the foaming materials.

In one embodiment, the functional group of the polar liquid in the invention is selected from at least one of the hydroxyl, carbonyl and ester. When the functional group includes hydroxyl, the polar liquid includes hydroxyl non-carbon compounds such as water; preferably, the polar liquid also includes hydroxyl carbon compounds and alkane compounds, such as alcohols, hydroxy acids, pentane, hexane, etc. No specific limit is made to the amount of hydroxyl non-carbon compounds in the polar liquid, which is listed as follows: 1 wt %, 5 wt %, 10 wt %, 15 wt %, 20 wt %, 25 wt %, 30 wt %, 35 wt %, 40 wt %, 45 wt %, 50 wt %, 55 wt %, 60 wt %, 65 wt %, 70 wt %, 75 wt %, 80 wt %, 85 wt %, 90 wt %, 95 wt % and 100 wt %, for example, 1-100 wt %.

In order to facilitate the physical foaming agent (such as nitrogen) to permeate the crosslinked prefabricated product and improve the nitrogen saturation concentration in the crosslinked prefabricated product during the current physical foaming process, the high pressure nitrogen effect generally needs to be used at the softening point, even near the melting point, but large cells are easily generated to cause uneven cells, even the surface collapses inwards, and the high foaming ratio product cannot be obtained. In the invention, the compatibility and saturation concentration of the nitrogen and the crosslinked prefabricate product can be improved by adding nitrogen to foam in the polar liquid environment, so that the high foaming ratio and uniform cellular structure can be obtained under the low temperature condition of the polar liquid.

In one embodiment, the ratio of the distance between the adjacent cross-linked prefabricated products of the invention to the thickness of cross-linked prefabricated products is (1.5-2):1. In the invention, nitrogen can be added to multiple prefabricated products for foaming together, and a certain distance needs to be kept between the prefabricated products; if adjacent crosslinked prefabricated products are called crosslinked prefabricated product A and crosslinked prefabricated product B, the distance between the adjacent crosslinked prefabricated products is the distance from a surface A1 where the crosslinked prefabricated product A is close to the crosslinked prefabricated product B to the crosslinked prefabricated product B, and the thickness of the crosslinked prefabricated products is the distance from a surface A2 where the crosslinked prefabricated product A is far from the crosslinked prefabricated product B to the surface A1 where the crosslinked prefabricated product A is close to the crosslinked prefabricated product B; if the distance between A1 and A2 is not constant, the maximum distance between A2 and A1 is regarded as the thickness of the crosslinked prefabricated products.

In addition, the inventor finds that compared with the general nitrogen and other superfluid environments, the distance between the crosslinked prefabricated products needs to be reasonably selected in the polar liquid environment, so that the crosslinked prefabricated products can better react with nitrogen-polar liquid to control the saturation and the increase of nucleating points in the prefabricated products, so as to avoid the great difference in the foaming ratio of the same batch of prefabricated products after nitrogen is added, and avoid affecting the subsequent foaming. In addition, the inventor finds that the phase dissolution and dispersion of nitrogen in the polar liquid can be promoted by gas-liquid mass transfer by controlling nitrogen at low temperature and the polar liquid at high temperature in the process of adding nitrogen, thereby further promoting the stability of nitrogen pre-foaming ratio.

In one embodiment, the difference between the softening point of the polymer and the temperature of the polar liquid is 20-30 DEG C. In the invention, the temperature of the polar liquid meets the following requirements: the temperature of the polar liquid is more than or equal to 40 DEG C.; and/or the difference between the softening point of the polymer and the temperature of the polar liquid is 20-30 DEG C., and the softening point of the polymer provided by the invention is more than or equal to 60 DEG C. The softening point is obtained by the test according to ASTM D1525, and is Vicat softening point. The temperature difference in the invention is the difference between the softening point of the polymer and the temperature of the polar liquid. The invention does not limit the temperature of the polar liquid, but only requires that the temperature of the polar liquid is 20-30 DEG C. lower than the softening point of the polymer.

In one embodiment, when nitrogen is added for foaming in the invention, the nitrogen temperature is 30-40 DEG C., and the nitrogen pressure is 10-20 MPa; after being maintained for 1-2 hours, nitrogen is pressurized to 30-40 MPa and maintained for 3-5 hours.

In one embodiment, the pressure release rate of the invention is 3-4 MPa/s.

The invention does not limit the nitrogen foaming time and the heating foaming time, which are controlled according to different polymers. In one embodiment, the heating foaming temperature of the invention is 100-200 DEG C., and the heating foaming time is 0.5-3 hours.

In addition, the inventor finds that after nitrogen is maintained at low pressure for a period of time and then maintained at high pressure for a period of time, the high cell density is easily formed in the process of nitrogen foaming to improve the foaming ratio and avoid large bubbles; this may be because maintaining nitrogen at low pressure and at the concentration of the polar liquid promotes the low concentration nitrogen to permeate the polymer and promotes nucleation to form a suitable polymer skeleton, so that the cells brought by high pressure increase the resistance in the increase process of nitrogen solubility in the polar liquid as the pressure increases, and more nitrogen can permeate the polymer under the fixed action of the polymer skeleton and the nitrogen nucleation sites to form homogeneous nucleation sites, being convenient to foam with supersaturated nitrogen after pressure relief and during heating to avoid the formation of large cells.

In addition, the inventor finds that when the pressure of the high-pressure system is relieved by fast pressure relief, the higher foaming ratio can be formed, and appropriate foaming channels can be obtained, so that the subsequent heating foaming process promotes the further foaming to obtain the uniform foaming materials.

Compared with the prior art, the invention has the following beneficial effects:

(1) Generally, inorganic foaming is foaming by infiltrating polymer materials with high pressure foaming agent for a long time. Foaming is mainly related to the compatibility of inorganic foaming agent and polymer. However, because of different properties between the inorganic foaming agent and the polymer, the inorganic foaming agent hardly infiltrates the polymer and forms good cells, so that the foaming ratio is low after nitrogen foaming and pressure relief. In the invention, foaming is carried out in a polar liquid system containing water, so that the infiltration of inorganic foaming agent is related to the compatibility of inorganic foaming agent and water, the compatibility of water and polymer, and the compatibility of inorganic foaming agent and water. The inventor accidentally finds that the foaming agent can be promoted to infiltrate the polymer and improve the prefoaming ratio.

(2) The inventor finds that in the polar liquid system, it is necessary to control the ratio of the distance between the adjacent crosslinked prefabricated products to the thickness of the prefabricated products as well as the difference between the melting temperature of the polymer and the temperature of the polar liquid to promote the adjacent prefabricated products to be in full contact with the polar liquid, and prefoaming can be performed through the system provided by the invention at small temperature difference, namely, at the low temperature of the polar liquid, to promote the foaming ratio and the cell uniformity.

(3) In addition, by controlling the nitrogen pressure and temperature and the temperature difference from the polar liquid, nitrogen can be dissolved and the nitrogen density can be improved due to the temperature difference in the process of adding nitrogen and pressurizing, so as to further promote the prefoaming stability and therefore improve the final foaming ratio.

DETAILED DESCRIPTION OF THE EMBODIMENTS

Examples

Example 1

Figure 1:
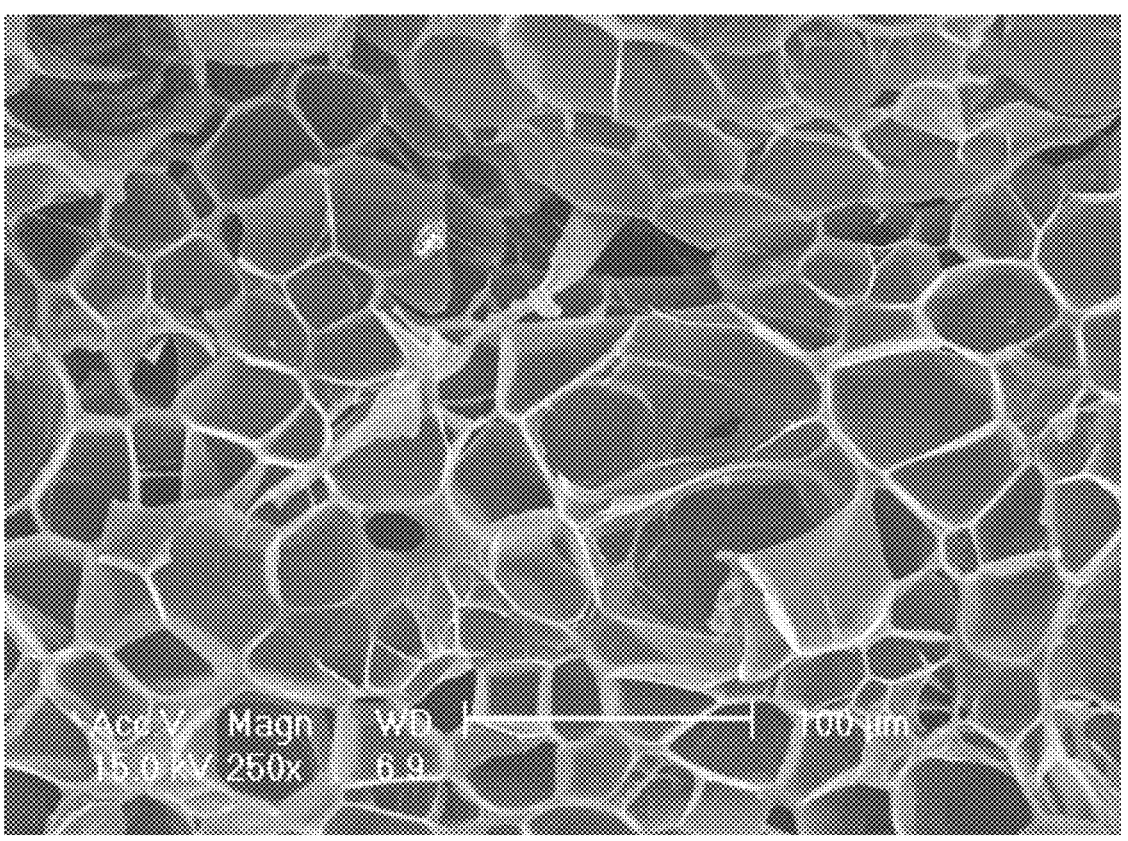
FIG. 1 is the SEM image of the example 1.

This example provides a method for preparing foaming materials by nitrogen foaming, which includes the following steps: crosslink the foaming matrix to obtain a plurality of crosslinked prefabricated products, add the crosslinked prefabricated products into a reaction reactor filled with polar liquid, add nitrogen for foaming, relieve pressure, and heat for foaming to obtain the foaming materials. The ratio of the distance between the adjacent crosslinked prefabricated products to the thickness of the crosslinked prefabricated products is 2:1, and the difference between the softening point of the polymer and the temperature of the polar liquid is 20 DEG C.; when nitrogen is added for foaming, the nitrogen temperature is 40 DEG C., and the nitrogen pressure is 20 MPa; after being maintained for 1 hour, nitrogen is pressurized to 40 MPa and maintained for 3 hours; the pressure release rate is 4 MPa/s, the heating foaming temperature is 130 DEG C., and the heating foaming time is 1 hour. The raw materials for preparing the foaming matrix include a polymer, a crosslinker and an initiator, wherein the polymer is EVA (with softening point of 70 DEG C.), 7320M purchased from FPC, the crosslinker is 1,1-Di-(tert-butylperoxy)-3,3,5-trimethylcyclohexane, which accounts for 5 wt % of the polymer, and the initiator is azodiisobutyronitrile, which accounts for 4 wt % of the polymer.

Example 2

This example provides a method for preparing foaming materials by nitrogen foaming, which includes the following steps: crosslink the foaming matrix to obtain a plurality of crosslinked prefabricated products, add the crosslinked prefabricated products into a reaction reactor filled with polar liquid, add nitrogen for foaming, relieve pressure, and heat for foaming to obtain the foaming materials. The ratio of the distance between the adjacent crosslinked prefabricated products to the thickness of the crosslinked prefabricated products is 1.5:1, and the difference between the softening point of the polymer and the temperature of the polar liquid is 30 DEG C.; when nitrogen is added for foaming, the nitrogen temperature is 30 DEG C., and the nitrogen pressure is 10 MPa; after being maintained for 2 hour, nitrogen is pressurized to 30 MPa and maintained for 5 hours; the pressure release rate is 3 MPa/s, the heating foaming temperature is 160 DEG C., and the heating foaming time is 0.8 hour. The raw materials for preparing the foaming matrix include a polymer, a crosslinker and an initiator, wherein the polymer is PP (with softening point of 150 DEG C.), B240P purchased from HYOSUNG the crosslinker is t-butyl peroxy 2-ethylhexyl monocarbonate, which accounts for 3 wt % of the polymer, and the initiator is 2,2'-azobis(2,4-dimethyl) valeronitrile, which accounts for 2 wt % of the polymer.

Example 3

This example provides a method for preparing foaming materials by nitrogen foaming, which includes the following steps: crosslink the foaming matrix to obtain a plurality of crosslinked prefabricated products, add the crosslinked prefabricated products into a reaction reactor filled with polar liquid, add nitrogen for foaming, relieve pressure, and heat for foaming to obtain the foaming materials. The ratio of the distance between the adjacent crosslinked prefabricated products to the thickness of the crosslinked prefabricated products is 1.8:1, and the difference between the softening point of the polymer and the temperature of the polar liquid is 25 DEG C.; when nitrogen is added for foaming, the nitrogen temperature is 35 DEG C., and the nitrogen pressure is 15 MPa; after being maintained for 1.5 hour, nitrogen is pressurized to 35 MPa and maintained for 4 hours; the pressure release rate is 3.5 MPa/s, the heating foaming temperature is 150 DEG C., and the heating foaming time is 1 hour. The raw materials for preparing the foaming matrix include a polymer, a crosslinker and an initiator, wherein the polymer is PP (with softening point of 150 DEG C.), 5010 purchased from YUHWA POLYPRO, the crosslinker is 1,1-bis(tert-amylperoxy)cyclohexane, which accounts for 3 wt % of the polymer, and the initiator is azodiisobutyronitrile, which accounts for 3 wt % of the polymer.

Example 4

This example provides a method for preparing foaming materials by nitrogen foaming, which includes the following steps: crosslink the foaming matrix to obtain a plurality of crosslinked prefabricated products, add the crosslinked prefabricated products into a reaction reactor filled with polar liquid, add nitrogen for foaming, relieve pressure, and heat for foaming to obtain the foaming materials. The ratio of the distance between the adjacent crosslinked prefabricated products to the thickness of the crosslinked prefabricated products is 1.8:1, and the difference between the softening point of the polymer and the temperature of the polar liquid is 5 DEG C.; when nitrogen is added for foaming, the nitrogen temperature is 35 DEG C., and the nitrogen pressure is 15 MPa; after being maintained for 1.5 hour, nitrogen is pressurized to 35 MPa and maintained for 4 hours, the pressure release rate is 3.5 MPa/s, the heating foaming temperature is 150 DEG C., and the heating foaming time is 1 hour. The raw materials for preparing the foaming matrix include a polymer, a crosslinker and an initiator, wherein the polymer is PP (with softening point of 150 DEG C.), 5010 purchased from YUHWA POLYPRO, the crosslinker is 1,1-bis(tert-amylperoxy)cyclohexane, which accounts for 3 wt % of the polymer, and the initiator is azodiisobutyronitrile, which accounts for 3 wt % of the polymer.

Example 5

This example provides a method for preparing foaming materials by nitrogen foaming, which includes the following steps: crosslink the foaming matrix to obtain a plurality of crosslinked prefabricated products, add the crosslinked prefabricated products into a reaction reactor filled with polar liquid, add nitrogen for foaming, relieve pressure, and heat for foaming to obtain the foaming materials. The ratio of the distance between the adjacent crosslinked prefabricated products to the thickness of the crosslinked prefabricated products is 1.8:1, and the difference between the softening point of the polymer and the temperature of the polar liquid is 25 DEG C.; when nitrogen is added for foaming, the nitrogen temperature is 35 DEG C., the nitrogen pressure is 35 MPa, nitrogen is maintained for 4.5 hours, the pressure release rate is 3.5 MPa/s, the heating foaming temperature is 150 DEG C., and the heating foaming time is 1 hour. The raw materials for preparing the foaming matrix include a polymer, a crosslinker and an initiator, wherein the polymer is PP (with softening point of 150 DEG C.), 5010 purchased from YUHWA POLYPRO, the crosslinker is 1,1-bis(tert-amylperoxy)cyclohexane, which accounts for 3 wt % of the polymer, and the initiator is azodiisobutyronitrile, which accounts for 3 wt % of the polymer.

Performance Evaluation

1. Prefoaming ratio: the measured thicknesses of the prefoaming material and the crosslinked product obtained after nitrogen foaming and pressure relieving are L2 and L1 respectively, so the prefoaming ratio is L2/L1 to calculate the average prefoaming ratio of 10 crosslinked prefabricated products in the same batch and the standard deviation of the foaming ratio. The standard deviation is optimal within 0.1 times, and the results are shown in Table 1.

2. Foaming ratio: the measured thicknesses of the foaming material and the crosslinked product are L2 and L1 respectively, so the foaming ratio is L3/L1. The results are shown in Table 1.

Figure 2:
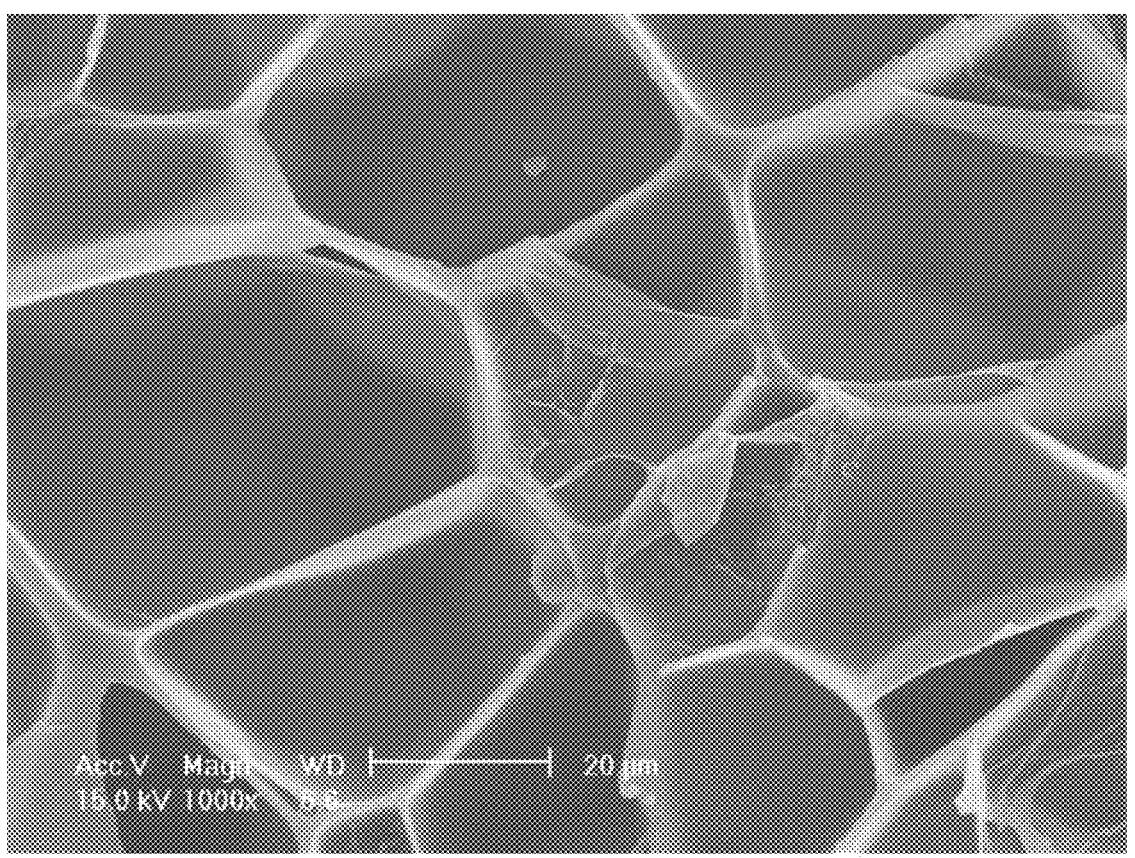
FIG. 2 is the SEM image of the example 2.
Figure 3:
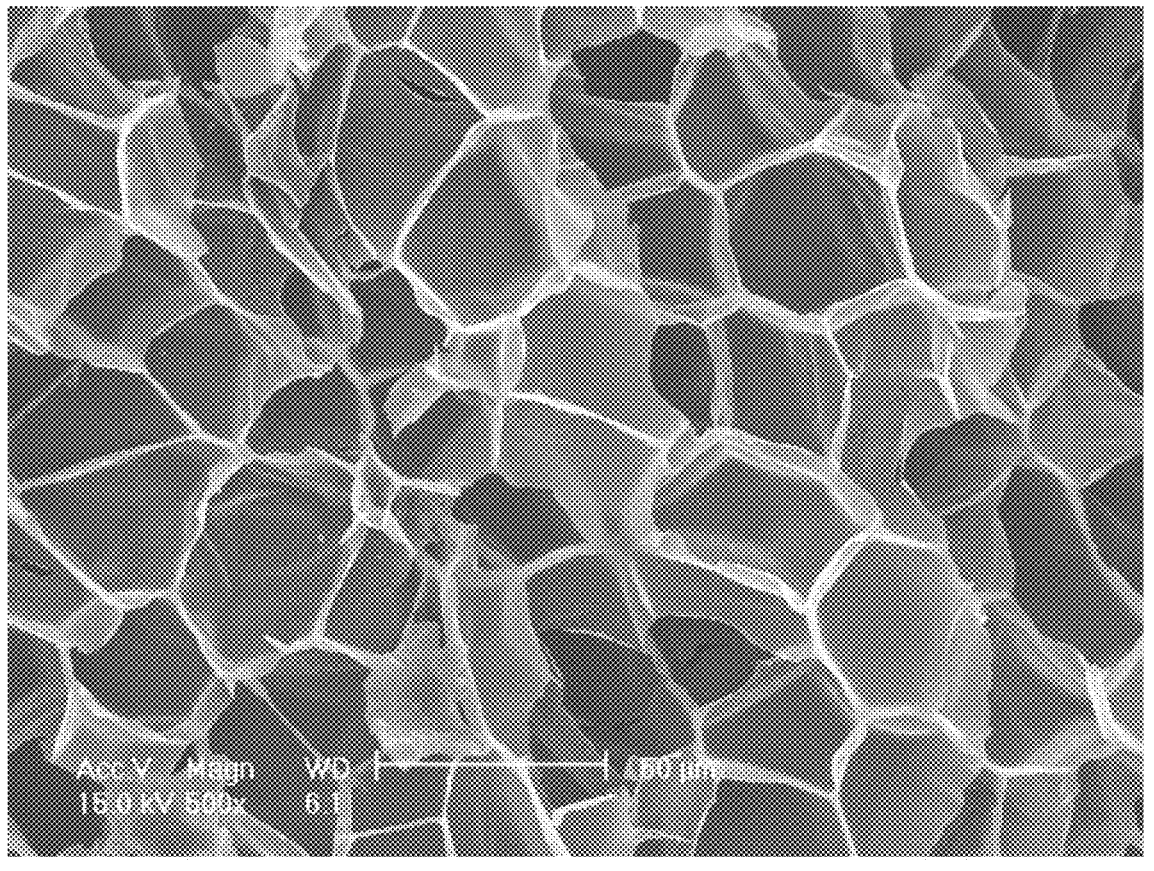
FIG. 3 is the SEM image of the example 3.

3. Cell uniformity: the cell uniformity on the cross sections of the cells is observed with a microscope, and uniform cells and no large cells are preferred. SEM images for the foaming materials in Examples 1-3 are shown in FIG. 1 to FIG. 3, and uniform cells can be observed. The results are shown in Table 1.

TABLE 1

| Example | Standard Deviation of Prefoaming Ratio | Foaming Ratio | Cell Uniformity |
|---|---|---|---|
| 1 | 0.18 | 10 | Uniform cells |
| 2 | 0.16 | 8 | Uniform cells |
| 3 | 0.12 | 9 | Uniform cells |
| 4 | 0.26 | — | Uneven cells, large cells existing |
| 5 | 0.24 | — | — |

The test results show that the preparation method for foaming materials provided by the invention can improve the foaming stability and the cell uniformity by impregnating the foaming matrix in the polar liquid and nitrogen environment to obtain the high foaming ratio and uniform foaming materials.

It is understood that the embodiments described herein should be considered only in the described sense and not for restrictive purposes. The description of characteristics, advantages or aspects in each embodiment should be deemed applicable to other similar characteristics, advantages or aspects.

What is claimed is:

1. A method for preparing foaming materials by nitrogen foaming, the method comprises the following steps: crosslinking a foaming matrix to obtain a plurality of crosslinked prefabricated products; adding the plurality of crosslinked prefabricated products into a reaction reactor filled with polar liquid; adding nitrogen into the reaction reactor for foaming, relieve pressure; and heating the reaction reactor for foaming to obtain the foaming materials, wherein when nitrogen is added for foaming, nitrogen temperature is 30-40 DEG C., and nitrogen pressure is 10-20 MPa and is maintained for 1-2 hours, and the nitrogen pressure is then increased to 30-40 MPa and maintained for 3-5 hours.

2. The method for preparing foaming materials by nitrogen foaming of claim 1, wherein the raw materials for preparing the foaming matrix comprise polypropylene polymers, which are a plastic.

3. The method for preparing foaming materials by nitrogen foaming of claim 1, wherein the crosslinking method for the foaming matrix is selected from one of thermal curing, ultraviolet curing and radiation curing.

4. The method for preparing foaming materials by nitrogen foaming of claim 1, wherein the functional group of the polar liquid is hydroxyl.

5. The method for preparing foaming materials by nitrogen foaming of claim 4, wherein when the functional group comprises hydroxyl, the polar liquid comprises a hydroxyl non-carbon compound.

6. The method for preparing foaming materials by nitrogen foaming of claim 5, wherein the polar liquid is selected from the group consisting of at least one of hydroxyl carbon compound, alkane compound and fatty acid.

7. The method for preparing foaming materials by nitrogen foaming of claim 1, wherein a ratio of an average distance between two adjacent crosslinked prefabricated products of the plurality of crosslinked prefabricated products to a maximum thickness of the plurality of crosslinked prefabricated products is 1.5:1 to 2:1.

8. The method for preparing foaming materials by nitrogen foaming of claim 2, wherein the difference between the softening point of the polymers and the temperature of the polar liquid is 20-30 DEG C.

9. The method for preparing foaming materials by nitrogen foaming of claim 1, wherein the pressure release rate is 3-4 MPa/s.

* * * * *